United States Patent [19]
Untermyer

[11] 3,728,544
[45] Apr. 17, 1973

[54] METHOD AND APPARATUS FOR MEASUREMENT OF CONCENTRATION OF THERMAL NEUTRON ABSORBER CONTAINED IN NUCLEAR FUEL

[75] Inventor: Samuel Untermyer, Portola Valley, Calif.

[73] Assignee: National Nuclear Corporation, Palo Alto, Calif.

[22] Filed: July 24, 1970

[21] Appl. No.: 58,039

[52] U.S. Cl. .................................. 250/83.1, 250/83.1
[51] Int. Cl. ................................................. G01t 3/00
[58] Field of Search ................................... 250/83.1

[56] References Cited

UNITED STATES PATENTS

| | | | |
|---|---|---|---|
| 3,222,521 | 12/1965 | Einfeld | 280/83.1 |
| 3,496,357 | 2/1970 | Weinzierl et al. | 250/83.1 |
| 2,936,274 | 5/1960 | Dessauer | 250/83.1 X |
| 3,436,538 | 4/1969 | Basdekas | 250/83.1 |

Primary Examiner—Archie R. Borchelt
Attorney—Flehr, Hohbach, Test, Albritton & Herbert

[57] ABSTRACT

Nuclear fuel samples containing burnable poisons are irradiated with epithermal neutrons and the neutron emission rate is counted to provide a measurement of fissile content through comparisons with the results of like steps performed on reference fuels. Where the fissile content is known, poison content is determined through irradiation of the sample with thermal neutrons. The presence of the poisons depresses the thermal neutron flux within the fuel and reduces the number of fission neutrons emitted. This emission rate is compared with the results of like steps performed on reference rods to indicate poison content. In another embodiment gamma emission by the fissile species is used in conjunction with thermal neutron interrogation to measure both fissile and absorber content.

5 Claims, 3 Drawing Figures

INVENTOR
SAMUEL UNTERMYER
BY
Flehr, Hohbach, Test,
Albritton & Herbert
ATTORNEYS

METHOD AND APPARATUS FOR MEASUREMENT OF CONCENTRATION OF THERMAL NEUTRON ABSORBER CONTAINED IN NUCLEAR FUEL

CROSS-REFERENCE TO RELATED APPLICATION

Reference is made to co-pending application Ser. No. 25,157 filed Apr. 2, 1970 and entitled Nuclear Fuel Assay System.

BACKGROUND OF THE INVENTION

In order to reduce reactivity variations during burnup of fuel in power reactors, leading reactor and nuclear fuel manufacturers have added thermal neutron absorbing materials known as burnable poisons to their fuel materials. In this way, loss of reactivity through depletion of the fissile materials is at least partially compensated through destruction of the poison materials by neutron absorption and consequent transmutation to non-absorbing materials. These poisons are generally placed in particular portions of the reactor, and confusion between poison and non-poison fuel may cause malfunction.

Gadolinium, europium, boron and their compounds have been added as poisons to fuels such as slightly enriched uranium oxide fuel rods, and the need has been recognized for a convenient and accurate system for determining the poison concentration in the fuel. It is desirable that such a system provide assurance against the possibility of inadvertent substitution of poison bearing fuel for unpoisoned fuel, or vice versa. This is important to the nuclear fuel industry since both types are normally assembled in the same factory and are used in different positions of the same fuel bundles, and since poisoned and unpoisoned pellets or rods cannot be distinguished by ordinary means.

SUMMARY OF THE INVENTION AND OBJECTS

It is a general object of the present invention to provide a method for the non-destructive measurement of the thermal neutron absorber concentration in nuclear fuel, and apparatus to make this measurement.

Another object of the invention is to provide a method and apparatus of the above character which operates without requiring disassembly and analysis of fuel elements and provides an accounting of the thermal neutron absorber content in the fuel.

Another object of the invention is to provide a method and apparatus of the above character which can determine both the poison and fissile material content of the fuel.

Another object of this invention is to provide a method and apparatus of the above character which can determine the poison and fissile material distribution along a fuel rod or other fuel element.

In general, this invention employs the irradiation of poison containing nuclear fuel with source neutrons shielded below the epithermal range and measurement of the fission neutron emission rate to provide an indication of fissile content when compared with like steps performed on reference fuels. Where the fissile content is known, the sample is irradiated with unshielded source neutrons. The poison within the fuel depresses the thermal neutron flux to reduce the emission rate of fission neutrons. This emission rate is compared with a parametric relationship of emission rate as a function of poison and fissile contents of reference fuels to provide the measure of poison content. In another embodiment used where both fissile and poison contents are unknown, fissile content is determined by means of gamma emission characteristics, while poison is determined by neutron emission characteristics.

These and other objects and features of the present invention will become apparent from the following description and claims when taken in conjunction with the accompanying drawings.

DESCRIPTION OF PREFERRED EMBODIMENTS

Figure 1:
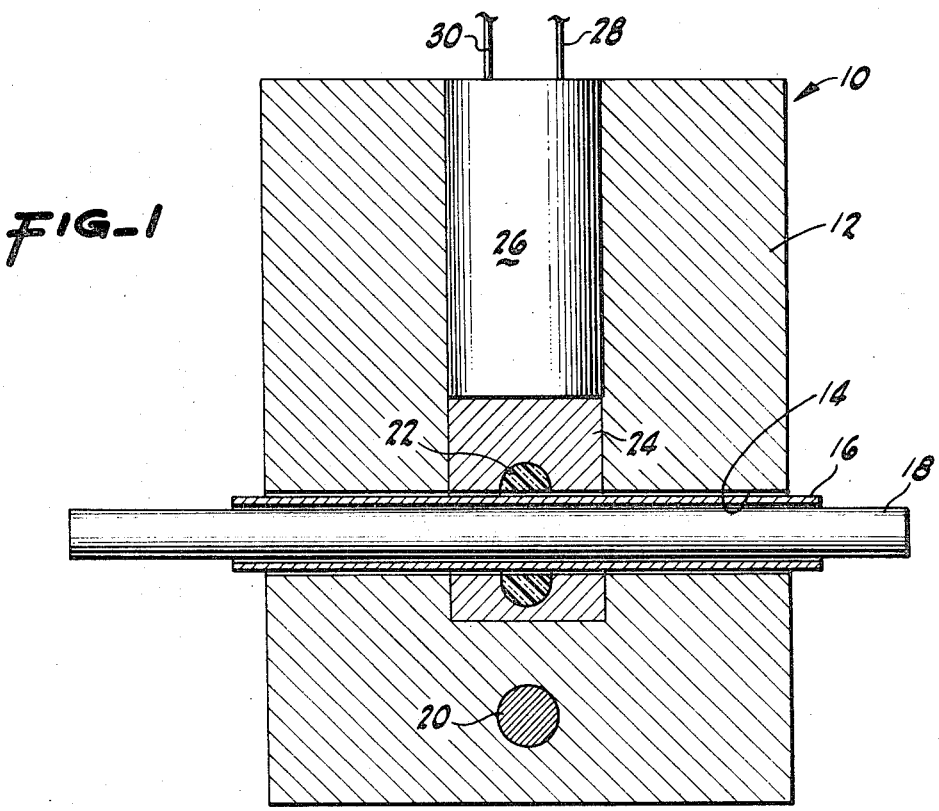
FIG. 1 is a schematic view of a preferred embodiment of an apparatus adapted to carry out the method of the present invention and suitable for measuring distribution of thermal neutron absorbers or fissile material in a fuel rod.

In the drawings FIG. 1 illustrates generally at 10 apparatus for carrying out the method of the invention. Apparatus 10 comprises a moderator body 12 of a suitable material such as paraffin, graphite or berylium, formed with a transverse opening 14. A thermal neutron shield 16 of cadmium in the form of a sleeve is removably mounted within opening 14 to surround the sample fuel rod 18. While the cadmium shield shown is preferred, it should be understood that the shield may be fabricated from other suitable material, such as boron, effective to shield and stop neutrons below substantially the epithermal energy range. As used herein, the term epithermal applys to neutrons having energy levels above the absorption resonance of the neutron absorber or poison, and thus covers an energy level somewhat lower than is commonly associated with the term. For example, the use of a thin boron sleeve shields neutrons with energies up to about 0.1 ev, and the use of a cadmium sleeve shields neutrons up to about 0.4 ev. A suitable neutron source 20, such as a Pu-LiH source, is positioned in the moderator to produce source neutrons which are thermalized in passing through the modulator material and then pass through the fuel rod therein. High energy fission neutrons radiating from the fuel are detected by a ring of scintillating material 22 selectively sensitive to fast neutrons mounted around the cadmium sleeve as disclosed in my co-pending application Ser. No. 25,157. Light impulses from the scintillating material 22 are transmitted through a light guide 24 of transparent material to a light detector or photomultiplier tube 26. The photomultiplier tube converts these pulses into electronic signals which are amplified and transmitted through leads 28,30 to a electronic counting and recording apparatus, not shown.

To determine the concentration of thermal neutron absorbers, or poisons, in nuclear fuel a number of reference fuel rods of known but variable fissile and poison contents are first tested to establish a parametric relationship of emission rate as a function of fissile content and neutron absorber content. These tests are conducted with sleeve 16 both removed and in place, the reference rods are irradiated with source neutrons, and the fission neutrons are counted. In this way, a family of curves each plotting neutron counts as a function of poison content is obtained, with fissile content as the variable parameter between the curves.

The measurement of a sample fuel is carried out as follows. Where the fissile content of the sample is unknown, sleeve 16 is first positioned around the fuel. The fuel is then irradiated with source neutrons which penetrate the shield in the epithermal energy range and fission neutron emission is counted. Since the thermal poison material causes only insignificant depression in the epithermal flux, this test is dependent on the fissile content alone. A comparison of this emission rate with the results of like tests performed on reference fuels of known fissile content indicates the fissile content of the sample. The shield is then removed so that the fuel is irradiated with thermal neutrons, and fission neutron measurements are taken. Knowing he fissile content, corrections are applied to these thermal measurements to provide a determination of the poison content. While calculations can be used to make these corrections, it is preferably to use empirical data based on the effect of fissile content on count rate of known samples with the cadmium sleeve removed.

Where the fissile content of a sample rod is uniform or known, poison content is determined by removing sleeve 16, irradiating the sample with source neutrons, and counting the neutron emissions. This count rate is compared through a direct or interpolated match with a reference curve representing the same fissile content to indicate the poison content of the sample. This method is quite useful in the case of commercial fuel production where fissile content is generally well known within close limits, although there is a possibility of confusing fuel having different poisons content. The method of the invention will preclude this possibility through tests taken while the cadmium sleeve is removed.

Figure 3:
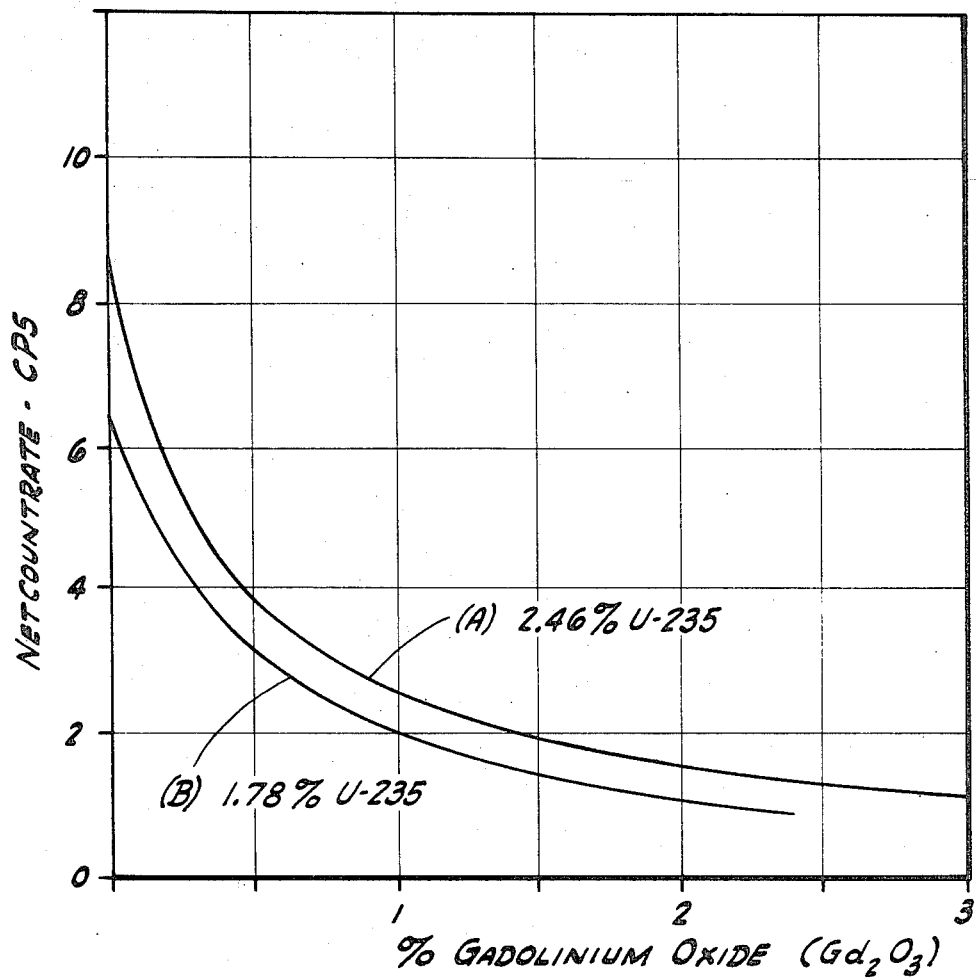
FIG. 3 is a graph illustrating the parametric relationship of thermal neutron absorber content as a function of emission count rate for two exemplary reference fuels of known and different fissile contents.

FIG. 3 illustrates the parametric relationship of poison content as a function of emission count rate for two exemplary reference fuels of known and different fissile contents. The fuels comprise pellets of $UO_2$ fuel and $Gd_2O_3$ poison, with a dimension of 2 inches in length and 1/4 inch in diameter. Curve A plots count rate as a function of poison content for a pellet fissile content of 2.4 percent U-235, and curve B plots this relationship for a pellet fissile content of 1.78 percent U-235.

Figure 2:
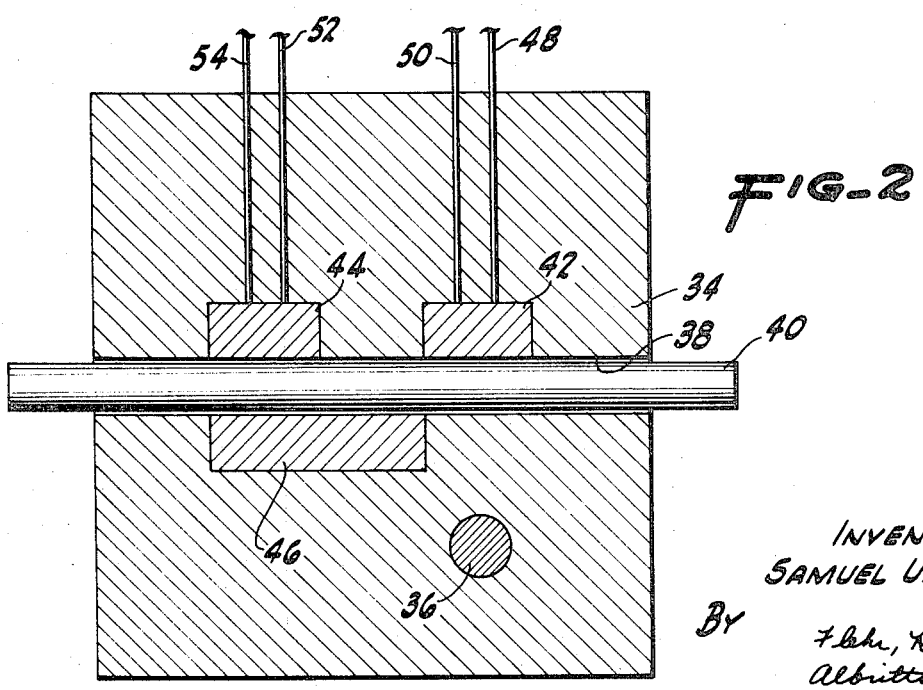
FIG. 2 is a schematic view of another embodiment of the present invention wherein gamma radiation is used to determine the distribution of the fissile material.

FIG. 2 shows in schematic form another embodiment of the invention for determining both poison and fissile contents in a sample fuel. This method is carried out by means of apparatus 32 which detects gamma and neutron emission to measure both fissile and absorber content. Apparatus 32 comprises a suitable moderator body 34 carrying a neutron source 36 and formed with a transverse opening 38 adapted to receive the sample fuel rod 40. A fast neutron detector 42 and gamma detector 44 are mounted in the moderator to receive radiation from the fuel. A suitable gamma shield 46 is mounted in the moderator to shield detector 44 from gammas originating at neutron source 36. Neutrons from the source are thermalized in the moderator and cause fissions in the fuel to radiate fission neutrons into neutron detector 42. This detector sends count signals to a suitable electronic recording apparatus, not shown, through leads 48,50. Gammas from the fuel, as the 380 KEV group in Pu-239 or the 165 KEV group in U-235, are detected in gamma detector 44 and transmitted through leads 52,54 to another suitable electronic recording apparatus, not shown. Fissile content is indicated by the neutron count while poison content is indicated by the gamma count, both on the bases of comparisons with calibrations determined by testing fuels with known fissile and poison content. A suitable drive mechanism, not shown, may be used to move the rod through the apparatus so that gammas and neutrons at each point in the rod are measured. In some cases, it is possible to combine the gamma and neutron counter; for instance, where a liquid scintillator detector is used and gamma counts are separated from neutron counts by the well-known method of pulse-shape discrimination, or where the counter shown in FIG. 1 is used and gamma counts are separated from neutron counts by pulse-height discrimination.

An example of the use and operation of the invention is as follows. A sample fuel rod containing pellets of 1.77 percent enriched uranium and having gadolinium oxide poison in one end of the rod was placed in a 1 inch diameter scintillation counter provided with removable and interchangeable cadmium and boron shields. The fuel was irradiated with neutrons from a Pu-LiH source and emission counts were taken using a Baird-Atomic single channel pulse height discriminator. Separate 1 minute counts were taken on a blank rod, on the Gd end of the sample rod, and on the U end first without a shield, next with the thin boron shield passing neutrons above about 0.1 ev, and then with the cadmium shield passing neutrons above about 0.4 ev. The following tabulates the count results:

A. TOTAL COUNTS

| SAMPLE | Unshielded | B Shield | Cd Shield |
|---|---|---|---|
| Blank | 826 | 651 | 673 |
| Gd end | 922 | 721 | 691 |
| U end | 2239 | 933 | 723 |

B. NET COUNTS

| SAMPLE | Unshielded | B Shield | Cd Shield |
|---|---|---|---|
| Gd end | 96 | 70 | 18 |
| U end | 1413 | 283 | 50 |

C. COUNTS RATIO

| RATIO | Unshielded | B Shield | Cd Shield |
|---|---|---|---|
| U end/Gd end | 14.8 | 4.0 | 2.8 |

The concentration of both Gd and U contents was determined from comparison of the foregoing count measurements with reference curves prepared from measurements made on standard fuel rods containing enriched uranium and Gd poison. The unshielded measurements provided the indication of poison content while the shielded measurements provided the indication of U content.

I claim:

1. A method for determining the concentration of non-fissionable thermal neutron absorbers in sample nuclear fuel of known fissile content by comparison with the fast fission neutron emission rate of a reference fuel irradiated with thermal neutrons, said reference fuel containing a fissile content substantially equal to said known fissile content, and a known on-fissionable thermal neutron absorber content, the method comprising the steps of irradiating said sample fuel with thermal neutrons measuring the emission rate of fast fission neutrons from said sample fuel, and comparing said emission rate of the sample fuel with said emission rate of the reference fuel to provide an indication of said non-fissionable neutron absorber content of the sample fuel.

2. The method of claim 1 in which the reference fuels include a plurality of fuel elements comprising varying known fissile content and known non-fissionable thermal neutron absorber content from which there has been established a parametric relationship of said reference fuel emission rates as a function of fissile content and non-fissionable neutron absorber content, wherein said comparison step comprises comparing the emission rate of the sample fuel with a like emission rate and fissile content of said parametric relationship to provide said indication of the non-fissionable neutron absorber content.

3. A method of determining the unknown fissile content of sample nuclear fuel in the presence of non-fissionable thermal neutron absorbers comprising the steps of irradiating a plurality of reference fuels with epithermal neutrons, said reference fuels comprising varying known fissile contents, measuring the emission rate of fast fission neutrons from each of the reference fuels and establishing therefrom a parametric relationship of emission rate as a function of fissile content, irradiating said sample fuel with epithermal neutrons, measuring the emission rate of fast fission neutrons from said sample fuel, and comparing said emission rate of the sample fuel with a like emission rate of said parametric relationship to provide an indication of said unknown fissile content, irradiating said sample fuel with thermal neutrons, measuring the emission rate of fast fission neutrons generated by said thermal neutrons, and correcting said last mentioned measurement for said indicated fissile content of the sample fuel to provide a measurement of the non-fissionable thermal neutron absorber content of the sample.

4. A method for determining the concentration of non-fissionable neutron absorbers and fissile content in sample nuclear fuel comprising the steps of irradiating a plurality of reference fuels with thermal neutrons, said reference fuels comprising varying known fissile and known non-fissionable thermal neutron absorber contents, measuring the emission rates of gamma rays and fast fission neutrons from each of the reference fuels and establishing therefrom a parametric relationship of gamma ray emission rate as a function of non-fissionable neutron absorber content and a parametric relationship of fast fission neutron emission rate as a function of fissile content, irradiating said sample fuel with thermal neutrons, measuring the emission rate of gamma rays from said sample fuel, comparing said gamma emission rate of the sample with said first mentioned parametric relationship to indicate the non-fissionable neutron absorber content of the sample fuel, measuring the emission rate of fast fission neutrons from said sample fuel, and comparing the said neutron emission rate of the sample with said last mentioned parametric relationship to indicate the fissile content of the sample fuel.

5. Apparatus for determining the concentration of non-fissionable thermal neutron absorption and fissile content in sample nuclear fuel including the combination of a source of neutrons, means to moderate the source neutrons to within the thermal energy range for irradiation thereof into said fuel, means to measure fast fission neutrons radiating from the fuel as an indication of said absorber concentration, means to measure gamma ray radiation from the fuel as an indication of said fissile content, and means to shield the gamma ray measuring means from gamma rays emitted from the neutron source.

* * * * *